United States Patent Office 3,023,104
Patented Feb. 27, 1962

3,023,104
FOOD COMPOSITIONS INCORPORATING CELLULOSE CRYSTALLITE AGGREGATES
Orlando A. Battista, Drexel Hill, Pa., assignor to American Viscose Corporation, Philadelphia, Pa., a corporation of Delaware
No Drawing. Filed July 5, 1960, Ser. No. 40,517
8 Claims. (Cl. 99—1)

This invention relates to reduced calorie food compositions comprising a food material and, as a non-nutritive agent, cellulose crystallite aggregates, the latter comprising a product of the acid hydrolysis of cellulose. More particularly, the invention relates to reduced calorie food compositions having an eating quality at least equal to that of the food material per se and in many cases improved thereover.

Interest in low calorie foods is today very large and is steadily increasing. The demand for such foods in the U.S. comes from a group which, according to a 1957 survey, is estimated as one-half to two-thirds of the population, and which includes the overweight, the pregnant, the diabetic, etc. According to a 1959 report, there are thirty-four million Americans in the overweight class alone; and the same source reveals that at least a quarter billion dollars is spent annually on low calorie foods. It has been pointed out more recently that an increasing proportion of the U.S. juvenile population is becoming fat and is in need of being made calorie conscious.

The need is a long standing one, and efforts have been and are being made to satisfy it. Leaving aside the non-prescription reducing pills and gadgets, for which large sums are spent, many of the reduced calorie foods heretofore developed have poor flavors, which reflects the fact that no satisfactory bulking material is available to manufacturers of these foods. Many of such foods have been reduced in calories by substituting artificial sweeteners for sucrose, or by reducing fat content. At present, saccharine, cyclamates, methyl and carboxymethyl cellulose, and sea weed derivatives are the main non-nutritive materials added to foods, and in each case these products are added at very low levels, since the limiting factor of undesirable flavors is inherent in each of them. Conventional fibrous cellulose has been used as a bulking agent, but the great defect of this material is its objectionable texture; thus, when mixed with a food or food ingredient and the mixture tasted, it is noticeable per se to the taste, is not smooth, has a fibrous mouth feel when chewed, gives the impression of the presence of an additional insoluble or residual substance, and tends to accumulate in the mouth. The unsatisfactory texture of the fibrous material cannot be remedied no matter how small the fibers are cut. Soluble cellulose derivatives have also been used as bulking agents but tend to form unpalatable gummy masses in the mouth.

To help meet the present and potential demand for low calorie foods, the invention provides food compositions that will satisfy the appetite of the consumer, enable him to continue to enjoy eating, and yet avoid the health problem arising from over-consumption of calories. These dietetic compositions incorporate cellulose crystallite aggregates, which as indicated, are a product of the acid hydrolysis of cellulose, and are described below in detail. The aggregates per se, it may be recorded, are bland in taste and odor, white in color, have a physical appearance resembling starch, and are edible but not nutritious. They are entirely free of the objectionable textural defects of agents like conventional fibrous cellulose, which adversely change the taste and mouth feel of the food with which they are mixed; rather, the aggregates are particularly characterized by having a smooth pleasant mouth feel, by becoming an indistinguishable part of the food with which they are mixed, and by simulating its eating quality.

It will be understood, therefore, that the cellulose crystallite aggregates help to provide low calorie food products while yet enabling the products to meet recognized standards of acceptability, particularly in respect of the essential property of mouth feel or eating quality. In other words, the aggregates afford a reduction in calorie content with no sacrifice of the familiar qualities of time-tested foods. Beyond this, and coincidently, therewith, the aggregates are capable of improving many foods, and the processing thereof, in a number of other respects. Thus, they permit desirable variations to be made in the physical characteristics of a food, such as its eating quality, appearance, cohesiveness, and texture, including its tactual, visual, and taste textures. For example, liquids and pastes may be formed into a crumb, and oily materials into a plastic mass like butter. A desirable property may be given to a food which lacks it, thus thickness may be imparted to a salad dressing. Or a less desirable characteristic of a food may be reduced, as in the case of candy of pronounced sweetness, where the presence of the aggregates tends to lessen the sweet taste. In other cases, improvements and advantages are realized in the processing of the food material, as by increasing the yield, or simplifying the handling of oily or sticky materials.

The invention, in brief, comprises a reduced calorie food composition comprising a food material and cellulose crystallite aggregates having a level-off D.P. (degree of polymerization).

This application is a continuation-in-part of applicant's copending patent application Serial No. 836,320, filed August 27, 1959.

As indicated, the cellulose crystallite aggregates are products obtained by the controlled acid hydrolysis of cellulose, there being formed an acid-soluble portion and an acid-insoluble portion. The latter comprises a crystalline residue or remainder which is washed and recovered, being referred to as cellulose crystallite aggregates, or as level-off D.P. cellulose.

In the acid hydrolysis, the acid dissolves amorphous portions of the original cellulose chains, the undissolved portions being in a particulate, non-fibrous or crystalline form as a result of the disruption of the continuity of the fine structures between crystalline and amorphous regions of the original cellulose. Although hydrolysis may be effected by various specific methods, including the use of various acids, a direct method which is free of secondary reactions comprises the treatment of the original cellulosic material with 2.5 normal hydrochloric acid solution for 15 minutes at boiling temperature. Another suitable method comprises treating the cellulosic material with 0.5% hydrochloric acid solution (0.14 normal) at 250° F. for 1 hour. The cellulose undergoing such treatment reaches, within the time period noted, a substantially constant molecular weight, or in other words, the number of repeating units or monomers, sometimes designated anhydroglucose units, which make up the cellulosic material, becomes relatively constant, from which it is apparent that the degree of polymerization of the material has leveled off, hence the name level-off D.P. cellulose. In other words, if the hydrolysis reaction were continued beyond the period noted, the D.P. would change very little if at all. In all cases, the level-off D.P. value reflects the fact that destruction of the fibrous structure has occurred as a result of the substantially complete removal of the amorphous regions of the original cellulose.

It may be observed that "crystallite," as used herein, is a cluster of longitudinally disposed, closely packed cellulose chains or molecules, and that "aggregates" are clusters of crystallites. The aggregates may also be said to comprise straight rigid, relatively non-twistable groups of linear chains. As indicated by X-ray diffraction tests, the crystallites and crystallite aggregates have a sharp diffraction pattern indicative of a substantially crystalline structure. Although the crystallite chains are of very uniform lengths, particularly by comparison with the original cellulose chains, strictly speaking they do exhibit some variation, and for this reason it is preferred to speak of average length, or of average level-off D.P. values.

The hydrolysis methods noted above are particularly characterized in that in each crystallite aggregate resulting from the hydrolysis, no constituent chain is connected to a chain in a neighboring aggregate; rather all the chains in an aggregate are separate from and free of those in neighboring aggregates.

The cellulose crystallite aggregates, or level-off D.P. cellulose, suitable for use in the invention is characterized by having a preferred average level-off D.P. of 125 to 375 anhydroglucose units. Ideally, within this range all of the material should have the same D.P., or chain length, but as this is difficult if not impossible to achieve, it is preferred that at least 85% of the material have an actual D.P. not less than 50 and not more than 550. More preferably, at least 90% of the material should have an actual D.P. within the range of 75 to 500, and it is still more preferred if at least 95% of the material has an actual D.P. in the range of 75 to 450. It may thus be apparent that the chain length of the level-off D.P. cellulose, or cellulose crystallite aggregates, is very uniform, a consequence of the hydrolysis, wherein the longer chains of the original cellulose were converted to shorter chains and the very short chains were dissolved away. In short, the hydrolysis effected a homogenization of the chain length distribution. As may also be apparent, a reference to crystallite aggregates having an average level-off D.P. of 125 means that the aggregates have an average chain length corresponding to 125 anhydroglucose units, and in accordance wtih the first preference noted above, at least 85% of this material will be made up of chains containing 50 to 350 such units; the remaining 15% may comprise shorter and/or longer chains.

More preferably, the average level-off D.P. is in the range of 200 to 300, of which material at least 90% has an actual D.P. in the range of 75 to 550.

Associated with the foregoing D.P. properties of the crystallite aggregates is the fact that their chemical purity is very high, the material comprising at least 95%, preferably at least 97% or 99%, polyglucose, or anhydroglucose units, based on chromatographic analysis. In terms of ash content, the aggregates preferably contain less than 100 p.p.m. (parts per million), although ash may range from about 10 to about 400 or 500 or 600 p.p.m. By comparison, conventional fibrous cellulose may have 1000 to 4000 p.p.m. of ash. In connection with the purity of the aggregates, it may be explained that the inorganic contaminants in the original cellulose, which are concentrated in the amorphous regions thereof, are dissolved away by the hydrolyzing acid, and the non-cellulose components of the original material are so effectively destroyed that their concentration is reduced to a very low level. Of interest is the fact that the chains produced by the hydrolysis each have on one end thereof a potential aldehyde group, such group being in the 1 carbon position of an end anhydroglucose unit and requiring the assistance of the ring oxygen atom, whch is ortho to it, to realize its aldehydic potential. The group has the reducing properties of an aldehyde group. On their other ends the chains have only hydroxyls as functional groups.

The aggregates resulting from the hydrolysis and washing steps are further characterized by having a particle size in the range of 1 or 2 to 250 to 300 microns, as determined visibly by microscopic examination. By subjecting the foregoing product to a mechanical disintegration, as described below, there is produced a material having a size in the range of less than 1 to about 250 or 300 microns. Within this range, the particle size and size distribution are variable, it being understood that the size and size distribution will be selected to suit a particular end use. In general, mechanically disintegrated particles are preferred.

The source material for the crystallite aggregates may suitably be one or more natural fibers such as ramie, cotton, purified cotton, also bleached sulfite pulp, bleached sulfate wood pulp, etc. Particularly suitable are sulfite pulp which has an average level-off D.P. of 200 to 300, at least 90% of which has a D.P. in the range of 75 to 550; and also sulfate pulp which has an average level-off D.P. of 125 to 175, at least 90% of which is in the range of 50 to 350.

Other suitable cellulose crystallite aggregates may have lower average level-off D.P. values, say in the range of 60 to 125, or even 15 to 60. Aggregates from both of these ranges have the chemical purity and other characteristics of the aggregates from the first noted D.P. range. Crystallite aggregates in the 60 to 125 average level-off D.P. range are obtainable from the acid hydrolysis of alkali-swollen natural forms of cellulose, of which a preferred source is cellulose that has been mercerized by treatment with 18% caustic soda solution at 20° C. for two hours. Aggregates in the 15 to 60 average level-off D.P. range are suitably prepared from regenerated forms of cellulose, including tire and textile yarns, other regenerated cellulose fibers, and cellophane.

In general, the cellulosic source material has a D.P. greater than the level-off D.P. thereof.

As obtained from the acid hydrolysis and water washing steps, the aggregates in the over-all average level-off D.P. range of 15 to 375 are in a loosely aggregated state, particularly in the larger sizes, say from 40 to 250 or 300 microns, and are characterized by the presence of many cracks in their surfaces, including similar surface irregularities or phenomena like pores, depressions, voids, fissures and notches. Because of such irregularities, the apparent or bulk density of the aggregates is much less than their absolute density. Furthermore, the cracks and other irregularities persist despite the application of high compressive forces on the aggregates. Thus, when they are compressed at 5,000 p.s.i., they exhibit an apparent density of 1.26; at 10,000 p.s.i. the apparent density rises to 1.32; at 15,000 p.s.i. it is 1.34; and at 25,000 and 37,000 p.s.i. it is 1.38 and 1.38 respectively. On the other hand, the absolute density of a unit crystal or crystallite is 1.55 to 1.57, from which it is apparent that the aggregates occlude considerable quantities of air in the surface cracks, voids, fissures, etc. The apparent densities of the dried disintegrated aggregates, at the compressive forces noted, are somewhat higher than the foregoing values. Of interest in this connection is the fact that the aggregates, dried or never dried, retain their pressed form after compression; in other words, three-dimensional structures of any desired shape may be formed by compressing the aggregate particles.

Either before or after mechanical disintegration the aggregates may be dried. Where the disintegration is performed in the presence of an aqueous medium, drying is preferably carried out after the disintegration step. Drying may be done in any suitable vacuum, or in air at room temperature or higher, going up preferably to 60° C. to 80° C., although the temperature may be up to 100 or 105° C. or higher. Another procedure is to displace the water in the wet aggregates, preferably by means of a low boiling, water miscible organic compound such as a low molecular weight aliphatic alcohol like methanol, ethanol, propanol, isopropanol, etc., and then to evaporate off the compound. The resulting dried aggregates tend to be more reactive and, as described below, to form stable dispersions and gels more readily. Spray drying either in air or in a vacuum is also satisfactory. Spray drying, and also freeze drying and drum drying, are particularly effective to dry the aggregates after the disintegration step. Freeze drying in particular favors the development of a very porous, reactive material which is characterized by the presence therein of a multiplicity of pores or depressions of extremely small size; such material readily forms stable dispersions and gels.

Mechanical disintegration of the aggregates, as referred to above, may be carried out in several ways, as by subjecting them to attrition in a mill, or to a high speed cutting action, or to the action of high pressures on the order of at least 5,000 or 10,000 p.s.i. The invention of disintegration by pressure is the invention of Orlando A. Battista and Patricia A. Smith and is disclosed in the copending application Serial No. 27,268, filed May 6, 1960. The disintegration of the aggregates is carried out in the presence of a liquid medium, although where high pressure alone is employed, such medium, although desirable, is not necessary. Water is a preferred medium, but other preferably edible liquids are suitable, including sugar solutions, polyols, of which glycerol is an example, alcohols, particularly ethanol, and the like. Whatever method is used, the disintegration is carried out to such an extent that the resulting disintegrated aggregates are characterized by forming a stable suspension in the aqueous medium in which they are being attrited, or in which they may be subsequently dispersed. By a stable suspension is meant one from which the aggregates will not settle out but will remain suspended indefinitely, even for periods measured in terms of weeks or months. The disintegrated aggregates are further characterized by the fact that such suspension forms an extremely adherent film when deposited on a glass panel or sheet or other suitable surface. At lower concentrations of aggregates, the suspension is a dispersion, while at higher concentrations it is a gel.

The preferred disintegration method is to attrite the aggregates by means of a high speed cutting action in the presence of an aqueous medium. The aggregates may be in a dry or never-dried state prior to attrition, although some water should be present during the cutting or shearing of the particles. If they are initially in the never-dried or wet state, that is, as received from the water washing step, they have a moisture content of at least 40% by weight, and it is possible to attrite them without further addition of water, although water may be added if desired. In any event, its preferred that the water content of the mixture undergoing attrition should be at least 10 to 15 to 20% by weight. The aggregates content of the mixture to be attrited is preferably at least 3% by weight, and desirably is higher as the efficiency of the cutting action increases with the aggregates content.

Suitable consistencies are those of mixtures containing up to about 35% by weight of aggregates and the balance water; such mixtures lend themselves well to good attrition and are convenient to handle both during and after the disintegration; they also have the advantage of directly producing a gel. At consistencies above 35%, say from 35 to 70%, attrition produces a material which, in the lower end of this range, resembles mashed potatoes of relatively soft or mushy appearance, and as the concentration increases, the material acquires a progressively firmer and drier appearance and consistency; above 50% the material tends to become crumbly. Although the attrited products of consistencies above 35% are not gels, they have the distinctive property of forming indefinitely stable, smooth gels of varying thickness and striking appearance upon the addition of water and stirring manually, as with a spoon, for a few minutes. At about 80% consistency, attrition results in a damp but free flowing material comprising discrete grains or granules and clumps of grains; the moisture content is apparent to the touch rather than the eye; and the material forms a gel upon being manually stirred or beaten in water. At 80 to 90% consistency, the product of attrition is a crumbly, free flowing, grainy, dry-appearing material that does not have a damp feel and which requires energetic beating in the presence of water to form a gel.

It may be useful to review briefly the characteristics of the dispersions and gels. They comprise attrited products of an attritable mixture having a solids content of at least 3% by weight during the attrition step. Necessarily, the resulting attrited product will also have at least 3% solids, although, as indicated, some useful materials are obtainable by diluting such attrited product to a consistency of 2% solids, or even 1%, to form a stable dispersion. In the next place, at least 1% by weight of solids in the product of attrition have a particle size of up to 1 micron. In the third place, the attrited product, in dispersion or gel form, forms substatially adherent films, preferably substantially continuous and self-supporting films, when applied to a suitable surface. Finally, the attrited product is, or forms, a stable and homogeneous colloidal dispersion or gel, the term "homogeneous" referring to the uniform visual appearance of the dispersion or gel. With respect to the last mentioned characteristic, it will be understood, as described, that attrited products having more than about 35% solids, although not gels, will easily form a gel upon manual stirring in water. It should also be understood that stable, homogeneous, colloidal dispersions and gels, as contemplated herein, are free of layers or sediment; there is no bottom layer of sediment; nor is there a top layer of visibly lower solids content than the balance of the mixture. Rather, the stable dispersions and gels are uniform and homogeneous throughout; have a uniformly white color, some mixtures being more, or less, intensely white than others, depending on the aggregates content and particle size distribution; and are further characterized by having a very smooth butterlike mouth feel. The preferred dispersions and gels are those that are stable for at least a month, and another preferred group comprises those stable for at least a week. Dispersions and gels that are stable for at least a day, or even an hour, are also useful for some purposes, as where they are to be used almost immediately. But as may be apparent, the more stable dispersions and gels have the advantage of being storable for a considerable period of time.

Generally, the concentration of aggregates in the aqueous dispersions is at least 3% by weight, and more preferably at least 4 or 5%. It is possible to make stable homogeneous dispersions having a solids content of up to 6 to 8% by weight, although more usually the solids rangs from 3 to 6%. In the case of gels, the aggregates content varies from 3 or 4% to about 30 or 35% by weight, the upper concentration being limited only by the capacity of the gel to be handled or worked. The concentration both of dispersions and gels may be varied not only by varying the consistency of the attritable mixture but also by adding water to the dispersion or gel, and, less preferably, by evaporating water therefrom. Usually the gels are thixotropic when they contain about 8 to 10% by weight, or more, of the aggregates. As may be apparent, the more concentrated dispersions may have a solids content which overlaps that of the less concentrated gels. The fact that gels are obtainable at concentrations as low as 3 or 4% solids is explainable by the presence of considerable amounts of aggregates of a particle size of substantially 1 micron and less, it having been found that gel formation is favored as the concentration of these fine particles increases. In fact, at concentrations as low as about 3% solids, gels are obtainable which are thixotropic provided the aggregates are substantially all of 1 micron size and less.

Following the mechanical disintegration of the aggregates, the resulting product, whether a dispersion or gel, may be taken and used as such; or it may be de-watered and dried; or it may be desirable to fractionate it into fractions having a more uniform particle size and size distribution. If the product is a mixture containing 35 to 90% solids, it may be stirred in water to form a gel, and the latter is handled as indicated. The dried products are also redispersible in aqueous media by the help of agitation, such as provided by a Waring Blendor, to form dispersions and gels.

In respect of the drying of the gels, it should be observed, first of all, that the preferred gels are those obtained by attriting the never-dried hydrolysis product; these gels have very desirable qualities in respect of smoothness, mouth feel, firmness, storage characteristics, etc. They may be dried to any practical moisture content, in which state they are redispersible in water, by the aid of a suitable attrition step, to form a gel, and this latter gel may again be dried if desired and again redispersed to form a subsequent gel. Gels are also obtainable by attriting the dried hydrolysis product, and these gels may be dried and attrited to again form gels. For producing the dried products, a number of drying procedures are available, and while redispersible materials result from each procedure, some procedures are more advantageous than others, as indicated. For example, freeze drying, spray drying, drum drying, and drying by solvent displacement each produce a material which has an appreciably lower bulk density than conventionally oven-dried materials, with freeze drying producing the lowest bulk density by far, vis., 9.8 lbs./cu. ft. as against 14.1 lbs./cu. ft. for oven-dried aggregates; each such procedure produces a material which is more easily redispersible in water, by the aid of an attrition step, to form a stable suspension than air or oven-dried materials; and each said procedure yields a more reactive product than air-dried or oven-dried materials. Freeze-dried, spray-dried, drum dried, and solvent displacement-dried materials are noticeably softer to the touch than products of the other drying steps; and freeze drying also produces a more porous product. With regard to the mouth feel of the various materials, those made by freeze drying, spray drying, and drum drying, are superior.

Fractionation of the attrited products may be accomplished by means of such separation procedures as mechanical sifting, settling in water, or centrifuging, a number of useful fractions being obtainable, including fractions having a particle size of up to 0.2, 1, 2, 5, or 10 microns. Still another desirable fraction is one whose dimensions are all below 100 microns, or below 40 or 50 microns; a fraction in the range of about 40 to 250 or 300 microns is of special interest because of the finding that particles in this size range, particularly those having one or two dimensions of up to 250 or 300 microns, tend to have cracks, fissures, notches, voids, depressions, pores, and the like in their surfaces. Preferably, each dimension of the particles should be within the size range noted for each fraction; however, particles having two dimensions within the size range are quite useful, as are particles having but one dimension within the size range although they are less preferred.

It will be understood that either dispersions, or gels, or fractions thereof, or attrited mixtures dilutable to a dispersion or gel, may be employed for preparing a food composition. Preferably, a gel is used.

The invention is broadly applicable to any food, food composition, food ingredient, or food product, whether comprised of a single ingredient or a mixture of two or more ingredients, whether liquid, liquid-containing, or solid, whether mainly carbohydrate, fat, protein, or any mixture thereof, whether edible per se or requiring preliminary conventional steps like cooking, mixing, cooling, mechanical treatment, and the like.

The invention is particularly applicable to bakery products, including the several varieties of bread, cake, cookies, crackers, biscuits, pies, and doughnuts; snack items like pretzels and potato chips; other pastries and specialties; also prepared mixes for making any of the foregoing products; and in cereals, flours, and macaroni products. Baked goods mainly comprise starch, and this is particularly true of cookies and crackers. The starch content is so predominant that heretofore it has been very difficult, if not out of the question, to reduce the calorie value of these products to any appreciable extent without impairing their taste; but by virtue of the bland quality of the crystallite aggregates and their smooth mouth feel, it is possible to reduce substantially the calorie value of many baked products without restricting their appeal. In other words, the aggregates may replace considerable amounts of flour in the foregoing products. They may also replace, in whole or part, bread additives like dextrins and starch. In the case of products made of finely ground flour, such as cakes and cookies, the aggregates serve to retain moisture and other liquids, and, in effect to increase the liquid-carrying capacity of such flours, thus helping to avoid staling of the products for longer periods of time, a result of particular advantage for high sugar-containing cakes. The use of the aggregates also enables normally liquid ingredients to be handled in a substantially dry free-flowing form; that is, the liquid ingredients may first be mixed with the aggregates to form a substantially dry granular mixture and the latter can then be added to the recipe mix. In effect, the liquids are dried, although actually they are sorbed, that is, both adsorbed and absorbed, by the aggregates. Such liquid ingredients may include shortening materials, water, milk, syrups, and emulsifiers; and other suitable ingredients are lard, butter, and eggs.

The crystallite aggregates have utility in foods comprising principally carbohydrates, such as sugars and starches, being capable of direct incorporation therewith and of being used wherever such foods are used, as in puddings, custards, and toppings, and in dry mixes for preparing the same. In the case of dry mixes, the aggregates are not only useful for making up the mix but also they help retain aqueous and oily ingredients therein, i.e., they prevent leaching out of the liquid as by sorption onto the walls of the package in which the dry mixes are distributed and sold.

The invention is of value in foods like dressings and spreads which are prepared by the aid of edible fats and oils, including shortening agents, butter, margarine, cooking and salad oils, plastic fats, lard, etc. Besides reducing the calorie value of the product and assisting to hold the ingredients together, particularly the liquids, the aggregates provide a desirable thickening effect.

The preparation of meat and meat products, including sausage, sausage products, meat loaves, etc. comprises another appropriate area for the utilization of the crystallite aggregates. In the manufacture of sausage products and meat loaves the aggregates help to simplify the processing steps by making the meat emulsions and meat mixes easier to handle, an advantage brought about by the sorptive capacity of the aggregates for the liquid-containing meat mixtures. The consistency and stability of a meat emulsion, for example, may be regulated in this way, and thus the cohesiveness of the final product may be varied. Coincident with the drying or sorption effect is the improved retention of flavors, water, and fats. As a consequence of fat and water retention, there will be less free fat in the product, and less shrinkage. Texture, juiciness, and other organoleptic characteristics may be improved by varying the firmness, juiciness, chewiness, etc. of a sausage or meat loaf product. Conventional binders like cereals, starches, and flours, which are all nutritious, may be replaced in whole or part by the crystallite aggregates, as may other frequently used meat loaf ingredients like macaroni, cheese, potatoes, etc. Better distribution of seasoning materials may be secured by first mixing them with the aggregates and then adding the mixture to the meat emulsions or mixes. The crystallite aggregates favor the formation of paste and paste-like products since the aggregates are quite amenable to being spread, especially in the presence of liquids. The aggregates may replace, at least partly, the use of ice to obtain a proper consistency and stability in meat emulsions; thus the aggregates may make it possible to achieve a desirable consistency by the use of water at room temperature and so avoid the necessity of refrigeration. An advantage of economic importance is the increased yield of the meat emulsion or meat mix obtainable when the aggregates are employed.

In one instance, hamburgers were prepared containing 5, 10, 15, and 20% of the aggregates, the balance being ground beef meat as bought in the store, and it was found that all of the patties so prepared, by comparison with controls, had the familiar hamburger flavor and were quite palatable. With respect to mouth feel, none gave any indication of the presence of the aggregates. Of additional interest were the findings that the aggregates-containing patties underwent less shrinkage than the controls, had much less tendency to burn, and had an interesting variation in respect of their chewiness.

Another contemplated application of the invention is in dairy product foods such as cheese and in foods using milk and cream. Naturally soft and semi-soft non-gratable cheeses may, by mixing the same with the aggregates, be transformed into a dry granular free-flowing form, making it more convenient to handle such cheeses when they are used as ingredients in a recipe. Milk and cream may be used more conveniently when mixed with the aggregates. For example, cream as obtained from milk, either with or without the preliminary removal of water from the cream, may be mixed with the aggregates to form a dry free-flowing mixture for use, say, in coffee, and if desired, the mixture may be packaged in inexpensive, single use, disposable paper containers, although it may also be stored in bulk and dispensed in any desired way, that is, by machine or by hand. In the result, there is provided a low calorie cream-containing mix whose use with coffee and other substances simulates natural cream.

The aggregates are also suitable for use in confections, including candy, chewing gum, baker's confections, etc. Particularly in candy, the aggregates have a tendency to decrease or cut the sweet taste to an extent, especially in candy of pronounced sweetness, without resorting to synthetic or substitute sweetening agents. Edible food dyes may be incorporated in the candy in a convenient manner by first sorbing a dye on and in the aggregates and then mixing in the latter with the other candy ingredients. In chewing gum the aggregates are of value for introducing flavors. Thus, a flavor-containing substance may be formed into a granular free-flowing mix with the aggregates, and the resulting mixture may be incorporated with the chicle or other chewable plastic gum base. Blooming of chocolate and other foods, comprising the release of oil, may be lessened through use of the aggregates.

Vegetables, fruits, and nuts may be benefited by the aggregates. For example, part of the vegetables used in soup bases may be replaced by the aggregates to effect a calorie reduction; or a color lightening effect, or a thickening of the soup may be achieved with or without replacing conventional ingredients. Shelled nuts may be thinly coated with powdered aggregates to improve their storage life. Miscellaneous foods in which the crystallite aggregates may be incorporated to advantage are gravies, sauces, jellies, jams, preserves, molasses, beverages, and the like. The aggregates provide a thickening effect in such foods as sauces and gravies.

With respect to their general application in foods, the aggregates may serve to replace, in whole or part, one or more components of a given food, particularly high calorie components such as fats and oils, sugar, and starch. Or they may replace conventional binders in many foods. In other instances they may simply be added to a conventional recipe to decrease the over-all calorie value, it being understood that the amount of the remaining components of the recipe will be proportionately decreased. In addition to the reduction in calories, and the various other benefits described, the employment of the aggregates brings about still another and substantial result by virtue of their therapeutic value as a safe, wholesome laxative.

In other instances the aggregates, by virtue of their compressibility, help to provide food products that may be shaped by compression into any suitable form, using compression pressures of up to 5000 p.s.i. or more. Many of the aggregates-containing food mixtures, such as those illustrated in Examples 10, 14 and 19 below, are also extrudable, particularly those wherein the food contains one or more liquid ingredients. Lightening of the color of a food product is possible by use of the aggregates, some fractions of which, as described, are characterized by being intensely white and opaque. As also described, dry mix foods of the convenience and instant types are easily prepared, even from liquid-containing ingredients, because of the unusually good sorptive action of the aggregates on liquids. The cuttability of many food products is improved by the aggregates, and they further tend to retard the melting, in warm climates, of meltable components.

The aggregates have no adverse effect on the food or food ingredients with which they are mixed; and similarly are not themselves adversely affected. In some cases they exert a protective or preservative action; thus, in one instance a 64:36 parts by weight mixture of blue cheese and the aggregates showed no noticeable change in appearance, consistency, aroma, or taste after being kept in a stoppered glass container for 5 months at room temperature.

The amount of aggregates incorporated in a food composition is variable, depending on the particular food, on whether or not an ingredient or ingredients is being replaced in whole or part, on the mouth texture and/or body desired, etc. The amount may vary from a concentration as low as about 0.1%, or less, to 90%, or more, by weight; but usually the amount is from about 5% to 25% by weight, and more preferably from about 5 to 20% by weight.

In some cases it is desirable to incorporate with the crystallite aggregates a small amount of a protective colloid to vary the texture or mouth feel of the resulting mix or food product, it being possible to increase the smoothness, or impart some chewiness, etc. The amount of such colloid may range from a tenth to a few percent, say from 0.1 to about 5%, preferably 0.1 to 2 or 3% by weight of the food product, and the colloid may be chosen from conventional materials such for instance as carrageenin, tragacanth, arabic, ghatti, and karaya gums; seaweed colloids such as agar, carrageen and sodium alginate; seed extracts such as locust bean, quince and guar; starches and starch derivatives, like converted starches; water-dispersible cellulose derivatives such as sodium carboxymethylcellulose; pectins such as apple pectin and citrus pectin; and modified pectins such as low methoxy pectins. Propylene glycol alginate, glycerol, and stearic acid mono- and diglycerides are also useful.

The invention may be illustrated by the following examples.

*Example 1*

Honey-flavored doughnuts were prepared having the following composition:

| Ingredient | Gms./batch | Percent |
|---|---|---|
| Eggs, fresh | 49.7 | 7.87 |
| Sugar | 31.0 | 4.91 |
| Crystallite aggregates | 79.5 | 12.60 |
| Honey | 105.5 | 16.72 |
| Milk | 185.0 | 29.31 |
| Shortening | 15.0 | 2.38 |
| Baking powder | 10.5 | 1.66 |
| Salt | 1.1 | .17 |
| Cinnamon | .2 | .03 |
| Nutmeg | .2 | .03 |
| Baking soda | 1.5 | .24 |
| Flour | 152.0 | 24.08 |
|  | 631.2 | 100.00 |

The crystallite aggregates were prepared by hydrolyzing Ketchikan wood pulp with a 0.5% HCl solution for 60 minutes at 250° F. The aggregates were washed with water and then dried in an oven at 65° C. for 24 hours under a vacuum of 29 inches of water. They had an average level-off D.P. of 220, a moisture content of 2.5% by weight, and a particle size in the range of 1 to 300 microns. The dried aggregates were first mixed with the honey by placing the latter in the bowl of a Model N–50 variable speed Hobart mixer equipped with a paddle or beater attachment and the mixer set in operation at a low speed corresponding to about 61 r.p.m. The beater comprised a stem having a plurality of spaced arms extending angularly downwardly from opposite sides, and a substantially V-shaped member connected the outer ends of the arms; in effect, the paddle resembled an inverted tree. The beater rotated and revolved in the bowl. In other words, it had a compound action: it revolved inside the bowl, and it rotated on its axis, the direction of rotation being opposite the direction of its movement around the bowl. The addition of the finely divided aggregates was done over a period of about 5 to 10 minutes, the mixture being converted to a freely flowable dry mass which was removed from the Hobart. The eggs were then beaten in the Hobart, and to them were added, during agitation, the sugar, and the aggregates-honey dry mass. The milk and the melted shortening (hydrogenated vegetable oil) were next added to the mix. Then the baking powder (monocalcium phosphate), salt, cinnamon, nutmeg, and baking soda (sodium bicarbonate) were combined and added, with agitation. Finally, the flour was added and mixing continued to form a smooth dough. The latter was chilled in a refrigerator, the doughnuts then formed therefrom and deep fat fried at about 370° F. They appeared to be normal in every observable respect, including their eating quality, by comparison with control doughnuts made at the same time wherein the aggregates were omitted. A second batch was made in which the aggregates content was only 5%, and these also were indistinguishable from the conventional doughnuts. As a result of the frying process, the doughnuts containing 5% aggregates showed a weight gain of 9.68%, while those containing 12.6% aggregates gained 2.45%. Satisfactory doughnuts were also made containing up to 20% by weight of the aggregates.

*Example 2*

A peanut butter cookie dry mix was prepared from the following ingredients:

| Ingredient | Gms./batch | Percent |
| --- | --- | --- |
| Crystallite aggregates | 128.0 | 13.92 |
| Peanut butter | 296.4 | 32.24 |
| Butter | 48.6 | 5.29 |
| Sugar, brown | 125.0 | 13.60 |
| Sugar, granulated | 126.5 | 13.76 |
| Salt | 3.1 | .34 |
| Baking soda | 1.8 | .19 |
| Flour, all purpose | 190.0 | 20.66 |
|  | 919.4 | 100.00 |

The crystallite aggregates were prepared as in Example 1. The peanut butter and the butter mere first mixed with the dried aggregates in the Hobart mixer to form a free flowing dry mass, after which all of the remaining ingredients were added, with mixing. Then there were added to the mix in the Hobart, with continued agitation, ½ teaspoon vanilla, one egg, and 185 ml. of water. The resulting heavy dough was rolled into small balls, flattened with a fork on a greased cookie sheet, and baked for 15 minutes in an oven preheated to 375° F. The flavor and eating quality of the resulting cookies were particularly excellent, and in other respects they were equal to the conventional product.

*Example 3*

Cellulose crystallite aggregates were prepared by hydrolyzing Ketchikan wood pulp with 2.5 normal HCl solution for 15 minutes at boiling temperature. The aggregates were washed with water and then dried at 65° C. They had an average level-off D.P. of 220, a moisture content of about 5% by weight, and a particle size in the range of 1 to 300 microns. Then a cup of wheat bran and ¾ cup of milk were mixed together and allowed to stand until the bran had absorbed the maximum amount of moisture. The cup used had a liquid capacity of about 250 ml. when full. One egg and ¼ cup of shortening were mixed with the moistened bran and the mixture was beaten well. Then a cup of the dried aggregates was stirred with the bran mixture, and 2½ tsp. baking powder, ½ tsp. salt, and ¼ cup sugar were also stirred into the mixture. Greased muffin pans were filled ⅔ full with the resulting doughy mixture and the latter baked in a moderately hot oven of about 400° F. for 30 minutes. The resulting bran muffins had the texture of conventional bran muffins, but the crumb was lighter in color; they were easily broken and easily chewed, and had an aggregates content of about 18% by weight.

*Example 4*

A layer cake was prepared as follows. One cup of sugar and ½ cup butter were blended together and mixed with 3 well beaten eggs. A cup of pastry flour and a cup of dried powdered cellulose crystallite aggregates were mixed together, the latter prepared as in Example 3. Then 3 tsp. of baking powder were added to the flour-aggregates mixture and the latter sifted three times. Portions of the flour mixture were added to the sugar-butter-egg mixture, alternating with small additions of milk, until all of the flour mixture and ⅔ cup of milk were added. A tsp. of vanilla was added and the mix was well beaten. It was baked in an oven for 25 minutes at 375° F. and resulted in a white-colored, low sugar layer cake of very good texture and containing about 13% by weight of the aggregates. The cake was finished off by applying to it a chocolate topping as prepared in Example 7.

*Example 5*

Dried cellulose crystallite aggregates, of the kind used in the preceding example, were mixed with cornstarch to form a powdered mixture comprising 90% dried aggregates and 10% cornstarch. The mixture was wetted with water to form a thick extrudable paste, and this was then extruded through a stainless steel tube having a single opening of ⅟₁₆ inch diameter at its discharge end. The mixture extruded smoothly, forming monofils of more or less continuous lengths, which were then dried in an oven at about 60° C., to produce hard spaghetti-like strands. These were broken to ½ to 1 inch lengths. When tasted, the dried product was crisp, fairly hard, and edible. A like product, but containing a chocolate flavoring material, had better palatability. Both products had good chewiness, and were considered to be suitable as a fibrous breakfast food, or as a basis therefor, particularly when modified by the addition of other ingredients, such as a flavor, sweetening agent, other cereal grain, and the like. Soft-textured products are obtained by decreasing the amount of aggregates in the extrudable mixture, although at an aggregates:cornstarch ratio of 50:50 the product had a somewhat gummy mouth feel.

*Example 6*

Never dried cellulose crystallite aggregates, prepared by hydrolyzing Ketchikan wood pulp with 2.5 normal HCl solution at the boil for 15 minutes, and having an average level-off D.P. of 220, a moisture content of 64%, and a particle size in the range of 1 to 300 microns, were diluted with water to a solids content of 30% and subjected to attrition in a Waring Blendor for a period of 15 minutes, there being formed a stable homogeneous colloidal gel having 30% solids. Then a square of unsweetened chocolate was melted and mixed with ½ cup of sugar, ⅛ tsp. of salt, and 2 cups of milk. The resulting mixture was heated, with stirring, until uniform, after which the above described gel was stirred in until a pudding-like consistency was reached. The latter mixture was chilled in a deep freezer and then removed. It comprised a chocolate pudding of smooth texture, somewhat firm consistency, and having the appearance of a conventional pudding. It had a good chocolate flavor and better than average palatability. The aggregates content was about 15% by weight.

*Example 7*

A portion of the chocolate pudding of Example 6 was diluted with a 10% aggregates-containing gel, the latter being formed by diluting the 30% gel of the preceding example, and the mixture was thoroughly stirred while heating for about 4 minutes. Upon cooling to room temperature, a smooth creamy chocolate sauce or dessert topping was obtained. The product had the consistency of heavy syrup, was suitably flowable, and had the color of milk chocolate. Its eating quality was very good, with no evidence of the presence of the aggregates.

*Example 8*

A half-cup of sugar and 5–6 drops of vanilla were thoroughly mixed in a Waring Blendor with 2 cups of a stable aqueous colloidal gel containing 20% by weight of crystallite aggregates prepared as in Example 6. The mixture was then chilled, giving an attractive-looking, snow white, vanilla-flavored, smooth-textured pudding which had the consistency of soft ice cream. It had about 16% by weight of aggregates.

*Example 9*

Never dried cellulose crystallite aggregates, prepared by hydrolyzing Ketchikan wood pulp with 0.64% HCl solution at 250° F. for ¾ hour, and having an average level-off D.P. of 220 and a moisture content of 66%, were diluted with water to a solids content of 13% and then, in an amount of 39 gms., were subjected to attrition in the Waring Blendor for 6 minutes together with 30 gms. of sugar, 229.8 gms. water, 0.3 gm. vanilla, and 0.9 gm. of sodium alginate. The weight percentage composition of the resulting smooth gel pudding was: aggregates 13%, sugar 10%, vanilla 0.1%, alginate 0.3%, and water 76.6%. The pudding had a smooth texture and an over-all palatable taste. It had a calorie value of about 0.4 calorie per gram, as compared with about 0.9 calorie per gram for a conventional pudding wherein cornstarch is present in place of the aggregates. The pudding did not appear to be affected by increasing the aggregates content to 20% by weight. Suitable puddings were also prepared omitting the alginate.

*Example 10*

A peanut butter streussel type crumb suitable for use as a topping was prepared, using the dried crystallite aggregates as made in Example 1. First, a portion of the aggregates were attrited in the Hobart mixer with brown sugar, and the resulting mixture was combined into a smooth mass with peanut butter. Then the remaining portion of the aggregates was added with slow mixing until a free flowing crumb was obtained. The final product had an excellent flavor and texture. Its composition was as follows:

| Ingredient | Gms./batch | Percent |
| --- | --- | --- |
| Peanut butter | 45.0 | 29.0 |
| Brown sugar | 75.0 | 48.2 |
| Crystallite aggregates | 35.0 | 22.8 |
|  | 155.0 | 100.0 |

*Example 11*

A reduced calorie cream salad dressing was prepared having the following composition:

| Ingredient | Gms./batch | Percent | Calories |
| --- | --- | --- | --- |
| Crystallite aggregates | 143.8 | 15.56 |  |
| Total water | 426.3 | 46.13 |  |
| Sugar | 68.0 | 7.36 | 29.28 |
| Salt | 14.4 | 1.56 |  |
| Dry mustard | 1.6 | .17 | .37 |
| Monosodium glutamate | .1 | .01 | .04 |
| Celery salt | .4 | .04 |  |
| Glycerol | 30.0 | 3.25 | 12.92 |
| Refined cottonseed oil | 80.0 | 8.66 | 77.92 |
| Egg yolk (fresh) | 16.0 | 1.73 | 6.15 |
| Vinegar, cider | 121.0 | 13.09 | 1.57 |
| Lemon juice | 20.0 | 2.16 | .87 |
| Alginate | 2.5 | .27 | .38 |
|  | 924.1 | 100.00 | 129.50 |

The crystallite aggregates were prepared as in Example 1, except that they were not dried, the moisture content being about 65%. The never dried aggregates, at a consistency of about 33% solids, were attrited for 20 minutes in the Hobart mixer at an intermediate speed of about 125 r.p.m. to produce a smooth gel. Then the sugar, salt, mustard, glutamate, and celery salt were premixed and added to the aggregates in the Hobart, with mixing, followed by the addition of the glycerol, cottonseed oil, egg yolk, vinegar and lemon juice, in that order. After further mixing, the sodium alginate was dissolved in water and added to the mix, and agitation was continued until the batch was smooth.

From a flavor standpoint, the product compared favorably with conventional salad dressing and mayonnaise. When stored for 3 months at 40° F. in a household refrigerator, the product showed no signs of viscosity loss or free water accumulation. The calorie values of the ingredients of the product, which appear in the table above, were taken from Nutritional Data Handbook published by H. J. Heinz Co. and refer to the weight percent composition of the dressing, rather than the grams per batch basis. In other words, if the weight percent values are considered to be on a gram basis, then the listed calorie values are applicable; for example, 100 grams of the dressing have a nutritive value of 129.5 calories. On a per gram basis, the calorie content of the product is 1.30 calories. Conventional cream salad dressing has a value of 3.90 cal./gm., and mayonnaise a value of 7.20 cal./gm. Further reduction of the calorie content of the product is possible, without any appreciable loss of quality and effectiveness, by reducing the amount of the cotton seed oil to 50% or less of its present concentration.

*Example 12*

A 30% gel of crystallite aggregates was prepared, as in Example 6, and to a 500 ml. volume of the gel there were added ⅛ tsp. of salt, ½ cup of corn oil, and 3 gms. of CMC (sodium carboxymethylcellulose) as an emulsifier. These ingredients were mixed in the Waring Blendor until a creamy butterlike product resulted that had the appearance of butter or oleomargarine. The product was palatable, having a flavor similar to butter, and was soft and easily spread. There was no visible oiling off. The material, which contained about 24% by weight of the aggregates and had a calorie value only a fraction of that of butter or margarine, was considered suitable as a replacement for either of the latter.

*Example 13*

A mayonnaise type salad dressing was prepared by thoroughly mixing ½ cup of corn oil, 1 tsp. of vinegar, and ⅛ tsp. of salt with 1 cup of a stable aqueous 15% colloidal gel of cellulose crystallite aggregates, prepared as in Example 6. The mixture was churned in the Waring Blendor for about 5 minutes, at the end of which time a smooth stable yellowish-looking salad dressing was obtained which had a texture like that of whipped cream and which very much resembled conventional mayonnaise in flavor, appearance, and consistency. It contained about 20% by weight of the aggregates.

*Example 14*

A conventional meat emulsion for making frankfurters was obtained from a commercial source, it having been made up in a conventional way. It comprised boneless chucks, pork trimmings, spices, seasonings, salt, sugar, and curing salts and was in the form of a moist, brownish, plastic, cohesive, tacky mass. While still in a chilled state, the mass was divided into portions and handled as follows:

(1) A 200-gm. portion was taken as a control and stuffed into a 2-inch diameter regenerated cellulose sausage casing. This step was done manually to observe at first hand the flow characteristics of the emulsion, which were considered to be difficult at best owing to the tackiness. Occlusion of air bubbles was a problem. The ends of the stuffed casing were tied to form a brownish-colored sausage link.

(2) A mixture of 95 gms. of the emulsion and 5 gms. of crystallite aggregates was prepared in the Hobart mixer. The resulting 5% aggregates-containing mixture was substantially indistinguishable from the control although it was thought that the mixture had acquired some firmness. The mixture was packed with difficulty into a length of sausage casing. The color of the link was substantially the same as the control link. The aggregates, which were prepared by hydrolyzing Ketchikan wood pulp with 0.5% HCl solution at 250° F. for 1 hour, had a D.P. of 220 and were dried to a moisture content of 2.5%.

(3) Using the crystallite aggregates described, a 10% aggregates-containing mixture, comprising 90 gms. of meat emulsion and 10 gms. of aggregates, was prepared in the Hobart, and while the resulting mass was still plastic and cohesive, some loss of tackiness was noticeable. The mixture was more easily packed into the casing, and the resulting link had substantially the same color as the control.

(4) A 20% aggregates mixture was prepared from 160 gms. of emulsion and 40 gms. of aggregates, there being produced a cohesive dough which was much less tacky and sticky than the control mass and which appeared to have extrudable properties. The mixture was much easier to stuff into the casing, and the resulting link, while still generally resembling the control link, was noticeably lighter in color than the latter.

All of the links were then heated for about 1¾ hrs. at 160° F., at the end of which time it was noticed that some oily amber fluid had colected in each link just beneath the casing, there being less fluid in the case of the No. 4 than the others. The control and Nos. 2 and 3 were red in color, no differences being apparent in this respect, while No. 4 was slightly less red than the others. The control link was softer to the touch than the others.

All links were immediately transferred to water maintained at 160° F. and were allowed to cook therein for 12 minutes. The control and Nos. 2 and 3 remained red in color during the cooking while No. 4 first appeared to acquire a brownish hue and then became pink. The links were next placed under a shower of cold tap water for 5 minutes and then were stored overnight in a refrigerator at 60° F.

Upon examination, all the links had the same general red color except that No. 4 was more pink than red. All had oily liquid disposed just beneath the casing, No. 4 having less than the others. No shrinkage was apparent, although in No. 4 the meat mixture filled the casing better than in the other links. The control was soft-to-firm to the touch, and the others were firmer, the degree of firmness increasing with the concentration of aggregates. All links were easily cut. A comparison of the cut surfaces showed that Nos. 2 and 3 appeared "meatier" than the control, that is, the cut surfaces of Nos. 2 and 3 appeared to have a truer, more fibrous meat texture. No. 4 also looked meatier than the control but less than Nos. 2 and 3. None of the links crumbled on cutting, and all had the normal aroma of cooked frankfurters. Cut slices of Nos. 2 and 3 were spreadable, the latter to a greater degree, whereas the control and No. 1 would not spread, appearing somewhat rubbery in this respect.

Tasting and eating of the links by a panel showed the following: the flavor of the control, Nos. 2 and 3 was considered superior to that of store-bought frankfurters, while that of No. 4 was considerably less than the others. The control had a soft chewy texture and an excellent eating quality, while Nos. 2 and 3 were each slightly more chewy and had excellent eating quality. No. 4 was thought to have less chewiness than the others in that it was less cohesive in the mouth. The control was very juicy but was exceeded in this respect by No. 2, while No. 3 was about equal to the control. No. 4 had some juiciness. Over-all, the control and Nos. 2 and 3 were judged very palatable and No. 4 less so.

*Example 15*

About 200 grams of Cheddar cheese were mixed in the Hobart mixer with crystallite aggregates of the kind used in Example 1, except that they had been dried to a moisture content of about 4%. The aggregates were added slowly, with agitation. When the aggregates-cheese mixture was in approximately a 1:4 weight ratio, a dry free-flowing mixture was obtained having an average particle diameter of about one millimeter. By mixing 6 parts of the dry cheese mixture and 4 parts of water, a reduced calorie product similar to a cheese spread was obtained having a homogeneous all-cheese mouth feel. The spread contained about 18% by weight of the aggregates.

*Example 16*

A dry mix ice cream was prepared as follows: dried crystallite aggregates and coconut oil were mixed in the Hobart to form a finely divided free-flowing crumb comprising 52% aggregates and 48% oil. The aggregates were prepared as in Example 1. Then 83.2 gms. of the crumb were dry-mixed in the Hobart with 60 gms. sugar, 48 gms. of dry milk-solids-not-fat, and 0.8 gm. of sodium alginate to produce a fine free-flowing dry ice cream mix. This mixture was then beaten with 208 ml. of water in a Mixmaster mixing device until thoroughly dispersed, placed in an ice cube tray, and stored in the freezer compartment of a household refrigerator for 1 hour. The resulting ice cream product had the taste and texture of conventional ice cream and was considered to be palatable. It had better resistance to melt down than the conventional product. The weight percentage composition was: fat 10%, sugar 15%, milk-solids-not-fat 12%, alginate 0.2%, crystallite aggregates 10.8%, and water 52%.

*Example 17*

One cup of the chocolate pudding of Example 6 was stirred into 2 cups of milk and malt flavor was added. The mixture was then whipped in a Waring Blendor for about 5 minutes, there being formed a smooth creamy liquid closely resembling a malted milk shake in appearance, body, and texture. It had an excellent flavor, a consistency of light cream, and was considered very palatable. The aggregate content was about 5% by weight.

*Example 18*

A cup of commercial catsup was mixed with 3 cups of water and heated to the boil, producing a very fluid mixture; then 2 cups of a smooth stable aqueous colloidal gel containing 20% by weight of cellulose crystallite aggregates and prepared as in Example 6, were thoroughly stirred into the heated mixture, there being formed a smooth creamy product. After cooling, the mixture became quite thick. The aggregates had a lightening or whitening as well as a thickening effect on the tomato catsup, and the product had the appearance, texture, body, and flavor of a conventional creamed tomato soup. The aggregates concentration was about 7%.

Example 19

A batch of caramel candy was made up and divided into 4 parts, the first being a control, while the second, third, and fourth parts were the same except that they additionally contained, respectively, 5, 10, and 14.4% of crystallite aggregates. The compositions of these batches in grams were as follows:

|  | Control | No. 1 | No. 2 | No. 3 |
| --- | --- | --- | --- | --- |
| Sucrose | 25.70 | 24.44 | 23.14 | 22.02 |
| Unsweetened chocolate chips | 8.48 | 8.07 | 7.64 | 7.27 |
| White corn syrup | 42.10 | 40.08 | 37.95 | 36.11 |
| Evap. whole milk | 16.20 | 15.40 | 14.59 | 13.87 |
| Salt | 0.13 | 0.12 | 0.12 | 0.11 |
| Butter | 7.20 | 6.84 | 6.48 | 6.17 |
| Crystallite aggregates |  | 5.01 | 10.07 | 14.42 |

The crystallite aggregates were prepared by hydrolyzing Ketchikan wood pulp with 0.5% HCl solution at 250° F. for ¾ hour. They had an average level-off D.P. of 240 and were dried to a moisture content of about 2%. Water was present in each composition as the evaporated whole milk comprised about 72% by weight of water, the corn syrup had an average water content of 19%, and the butter about 15.5%; thus, the control sample, for example, contained about 20% by weight of water. The candy was prepared conventionally, the corn syrup, sugar, and salt being first slowly cooked together, followed by the addition of the butter. Then the milk was added drop by drop, and cooking continued slowly to a temperature of about 238° F., after which the chocolate was added. The material was transferred to buttered pans and cooled. In Nos. 2 and 3, the crystallite aggregates were added to the batch after the addition of the butter, and in No. 4 the aggregates addition was made following the milk.

All samples had a normal appearance, and this was also true of cut surfaces of the control and Nos. 1 and 2. The cut surface of No. 3 lacked the smooth look of caramel, appearing to have a somewhat coarse texture. All samples had a dark brown color. The flavor of the control and Nos. 1 and 2 was very good, while No. 3 was considered to be good. The control and No. 1 had a typically smooth caramel texture and chewy quality; No. 2 was slightly drier and slightly less cohesive in the mouth and appeared to resemble Toosie-Roll candy. No. 3 had a fudge-like texture and was less cohesive than No. 2, however, it was judged to be palatable although not to the same extent as the control and Nos. 1 and 2. Generally, as the crystallite aggregates content increased, the candy appeared to become less sweet to the taste and less cohesive in respect of its mouth feel.

Example 20

A quantity of conventional milk chocolate was melted, added to the Hobart mixer, and then followed by the addition of a sufficient amount of dried crystallite aggregates to produce a dry, free-flowing powder containing about 32% by weight of the aggregates. The latter were prepared as in Example 1 except that the moisture content was about 5% by weight. Then 6 parts of water were added to 4 parts of the powder, with stirring, to form an instant spread which had all of the flavor, aroma and taste of the original chocolate. The spread contained about 13% by weight of the aggregates.

In all of the products described in the examples, unless noted otherwise, the presence of the crystallite aggregates was not detectable by the mouth feel of the products.

Although the invention has been described in connection with specific embodiments of the same, it will be understood that it is capable of obvious variations without departing from its scope.

In the light of the foregoing description, the following is claimed:

1. A reduced calorie food composition comprising a mixture of a food material and cellulose crystallite aggregates; said aggregates per se comprising the acid-insoluble crystalline residue of the acid hydrolysis of cellulose and being characterized by the uniformity of the lengths of the constituent chains thereof, said aggregates having an average level-off D.P. of 15 to 375 anhydroglucose units, the constituent chains of each aggregate being separate from and free of those in neighboring aggregates, said aggregates being further characterized by having a sharp X-ray diffraction pattern indicative of a substantially crystalline structure, and said aggregates having a bland taste and odor and being edible but not nutritious; said composition having the eating quality of the food material.

2. A reduced calorie food composition incorporating therein, as a non-nutritive substance, mechanically disintegrated cellulose crystallite aggregates, said aggregates comprising the acid-insoluble crystalline residue of the acid hydrolysis of cellulose and being characterized by the uniformity of the lengths of the constituent chains thereof, said aggregates having an average level-off D.P. of 15 to 375 anhydroglucose units, the constituent chains of each aggregate being separate from and free of those in neighboring aggregates, said aggregates being further characterized by having a sharp X-ray diffraction pattern indicative of a substantially crystalline structure, by having a chemical purity of at least 95%, an ash content of less than 600 p.p.m., and a particle size in the range of less than 1 to 300 microns, and said aggregates comprising straight, rigid, relatively non-twistable groups of linear chains.

3. The product of claim 1 in which at least 1% by weight of the cellulose crystallite aggregates in the composition having a particle size of up to 1 micron.

4. A reduced calorie bakery food composition of claim 1 in which the food material includes a bakery ingredient.

5. A reduced calorie oleaginous food composition of claim 1 in which the food material includes an edible oleaginous material.

6. A reduced calorie aqueous food composition of claim 1 in which the food material includes an edible aqueous liquid and at least 1% by weight of said cellulose crystallite aggregates have a particle size up to 1 micron.

7. The reduced calorie aqueous food composition of claim 6, which food composition is in the liquid state.

8. The reduced calorie aqueous food composition of claim 6, which composition is in the frozen state.

References Cited in the file of this patent

UNITED STATES PATENTS 2,302,511    Wallach _____ Nov. 17, 1942

OTHER REFERENCES

"Industrial Gums," by Whistler et al., Academic Press, New York and London, 1959, page 572.

"Crops in Peace and War," The Yearbook of Agriculture, 1950–1951, U.S. Department of Agriculture, pages 793–797.